US012727709B2

(12) United States Patent
Zheng et al.

(10) Patent No.: US 12,727,709 B2
(45) Date of Patent: Sep. 8, 2026

(54) INDUCTION CHAMBER DOOR OPENING AND CLOSING DEVICE

(71) Applicant: Hangzhou Haocha Tong Technology Co., Ltd., Hangzhou (CN)

(72) Inventors: Haoze Zheng, Lishui (CN); Zihui Li, Heyuan (CN); Xiang Chen, Xinyi (CN)

(73) Assignee: Hangzhou Haocha Tong Technology Co., Ltd., Hangzhou (CN)

( * ) Notice: Subject to any disclaimer, the term of this patent is extended or adjusted under 35 U.S.C. 154(b) by 523 days.

(21) Appl. No.: 18/504,888

(22) Filed: Nov. 8, 2023

(65) Prior Publication Data

US 2025/0120533 A1 Apr. 17, 2025

(30) Foreign Application Priority Data

Oct. 11, 2023 (CN) ........................ 202311310474.1

(51) Int. Cl.
*A47J 31/44* (2006.01)
*A47J 31/06* (2006.01)
*A47J 31/52* (2006.01)

(52) U.S. Cl.
CPC ....... *A47J 31/4403* (2013.01); *A47J 31/0642* (2013.01); *A47J 31/52* (2013.01)

(58) Field of Classification Search
CPC .. A47J 31/4467; A47J 31/407; A47J 31/4407; A47J 31/3666; A47J 31/3685;
(Continued)

(56) References Cited

U.S. PATENT DOCUMENTS 7,617,763 B2 * 11/2009 Chen .................. A47J 31/3666 99/302 R
7,650,832 B2 * 1/2010 Magg .................. A47J 31/3685 99/302 R
(Continued)

FOREIGN PATENT DOCUMENTS

CN 105292869 A 2/2016
CN 107211646 A 9/2017
(Continued)

OTHER PUBLICATIONS

CN-209518751-U English translation (Year: 2019).*

*Primary Examiner* — Chris Q Liu
(74) *Attorney, Agent, or Firm* — Nitin Kaushik

(57) ABSTRACT

The present disclosure provides an induction chamber door opening and closing device. The induction chamber door opening and closing device has a chamber door, a stretching mechanism, a recognition mechanism and an illumination sensing mechanism, wherein the chamber door has a rectangular shape and is provided at an outlet position of the induction chamber; the stretching mechanism is provided between the chamber door and the induction chamber mechanism for driving the chamber door to open and close; the recognition mechanism is provided on a surface of the chamber door for driving the chamber door to open by recognizing a tea capsule; the illumination sensing mechanism is provided on a side wall of the chamber door, and is configured for driving the chamber door to close by illumination sensing; the recognition mechanism is a color-changing instrument.

4 Claims, 3 Drawing Sheets

(58) Field of Classification Search
CPC ................ A47J 31/0626; A47J 31/0663; A47J 31/0684; A47J 31/3671; A47J 31/3695; A47J 31/44; A47J 31/4403; A47J 31/446; A47J 31/46; A47J 31/462; A47J 31/52; A47J 31/005; A47J 31/06; A47J 31/0642; A47J 31/0668; A47J 31/18; A47J 31/24; A47J 31/36; A47J 31/3604; A47J 31/3623; A47J 31/3633; A47J 31/3638; A47J 31/3676; A47J 31/369; A47J 31/40; A47J 31/4471; A47J 31/4482; A47J 31/4496; A47J 31/467; A47J 31/469; A47J 31/525; A47J 31/5253; A47J 31/5255; A47J 31/54; A47J 31/60
USPC ......... 99/295, 275, 279, 280, 281, 290, 299, 99/300, 318, 323
See application file for complete search history.

(56) References Cited

U.S. PATENT DOCUMENTS 7,654,192 B2 * 2/2010 Oehninger .......... A47J 31/4482 99/280
7,779,749 B2 * 8/2010 Noordhuis ............ A47J 31/467 426/77
8,607,691 B2 * 12/2013 Magg ...................... A47J 31/36 99/302 R
8,671,828 B2 * 3/2014 Denisart ............. A47J 31/3695 99/295
8,895,095 B2 * 11/2014 Star ..................... A47J 31/4467 99/279
10,098,494 B2 * 10/2018 Denisart ............. A47J 31/3695
10,130,208 B2 * 11/2018 Iacobucci ........... A47J 31/3633
10,499,762 B2 * 12/2019 Gordon ................. A47J 31/407
2010/0203209 A1 * 8/2010 Fishbein ................. A47J 31/18 99/290
2013/0247470 A1 * 9/2013 Zhong ................. A47J 31/4407 49/383
2015/0101489 A1 * 4/2015 Zhang ................... A47J 31/407 99/295

FOREIGN PATENT DOCUMENTS

CN 209518751 U * 10/2019
CN 212230250 U 12/2020

* cited by examiner

INDUCTION CHAMBER DOOR OPENING AND CLOSING DEVICE

CROSS-REFERENCE TO RELATED APPLICATIONS

The application claims priority to Chinese patent application No. 202311310474.1, filed on Oct. 11, 2023, the entire contents of which are incorporated herein by reference.

TECHNICAL FIELD

The present disclosure pertains to the field of induction chamber doors, and more particularly to an induction chamber door opening and closing device.

BACKGROUND

The induction chamber door opening and closing device is an advanced access control system, which can control the opening and closing of the chamber door without using a key. The device is based on a technique called "electromagnetic induction", which identifies the presence of a user and controls the opening and closing of the door by detecting changes in the magnetic field around the chamber door. The background of induction chamber door opening and closing devices can be traced back to decades, when people began to explore how to use electromagnetic induction to control automation equipment. With the continuous progress of technology, the application of electromagnetic induction is expanding, including access control systems, electric vehicles, robots, aircraft, etc. The sense of the induction chamber door opening and closing device is that it can improve the security and convenience of the access control system.

The existing induction chamber door is widely used in tea-drinking machines and other small equipment to drive the opening and closing of the induction chamber door. However, the existing induction chamber door opening and closing device can only open the chamber door and cannot close it via induction, which easily causes the entrance of dust.

SUMMARY

In view of the foregoing content, the present disclosure provides an induction chamber door opening and closing device, which can solve the problem that the existing induction chamber door opening and closing device can only open the chamber door and cannot close it via induction, which easily causes the entrance of dust The disclosure is realized in the following manner.

The present disclosure provides an induction chamber door opening and closing device, comprising a chamber door, a recognition mechanism and an illumination sensing mechanism, the chamber door being provided at an outlet position of the induction chamber, the recognition mechanism being provided on a surface of the chamber door and configured for recognizing a tea capsule to drive the chamber door to open, the illumination sensing mechanism being provided on a side wall of the chamber door, not in contact with outside air, and configured for driving the chamber door to be closed by illumination sensing, an interior of the chamber door being further provided with a puncturing mechanism for puncturing the tea capsule.

The technical effect of an induction chamber door opening and closing device provided by the present disclosure is as follows: setting a chamber door, automatically opening and closing the induction chamber, saving hands and avoiding pollution to the induction chamber; setting a recognition mechanism to drive the chamber door to open by recognizing the tea capsule: by providing the illumination sensing mechanism, automatically sensing illumination change, and driving the chamber door to close by illumination sensing, thus solving the problem that the existing induction chamber door opening and closing device can only open the chamber door and cannot close it via induction, which easily causes the entrance of dust On the basis of the above-mentioned technical solution, the induction chamber door opening and closing device of the present disclosure can be further improved as follows.

The recognition mechanism is a color-changing instrument, the color-changing instrument being provided at a top of the chamber door, the color-changing instrument being of the same size as the chamber door for recognizing the tea capsules at various positions of the chamber door.

Further, the recognition mechanism further includes a first switch electrically connected to the color-changing instrument for controlling switching of the color-changing instrument.

Further, the illumination sensing mechanism is an illumination sensor, and the illumination sensor is provided at one side of the chamber door and is in contact with the outside air when the chamber door is opened, for driving the chamber door to be closed by sensing change of illumination inside the chamber body.

Further, the illumination sensing mechanism further includes a second switch, the second switch being electrically connected to the illumination sensor for controlling switching of the illumination sensor.

Further, the chamber door has a rectangular shape, and further includes a stretching mechanism, the stretching mechanism is provided between the chamber door and the induction chamber mechanism for driving the chamber door to open and close; the stretching mechanism includes a cylinder and a spring, the cylinder is provided inside the induction chamber, one end of the spring is fixedly connected to an output shaft of the cylinder, the other end of the spring is fixedly connected to one end of the chamber door, and the spring is configured for driving the chamber door to open and close under pull by the cylinder.

By setting the stretching mechanism, the chamber door is driven to be opened and closed to avoid the uncertainty of manual opening and closing.

Further, the cylinder, the spring and the chamber door are on a same horizontal plane for horizontally pulling the chamber door to open and close, the spring being a steel spring.

Further, a sealing layer is provided at a position where the chamber door is in contact with the sensing mechanism, and the sealing layer is configured to reduce vibration when the chamber door is opened and closed, thereby sealing the sensor.

Compared with the prior art, the beneficial effects of the induction chamber door opening and closing device provided by the present disclosure are setting a chamber door, automatically opening and closing the induction chamber, saving hands and avoiding pollution to the induction chamber; driving, by setting the stretching mechanism, the chamber door to open and close to avoid the uncertainty of manual opening and closing; setting the recognition mechanism to drive the chamber door to open by recognizing the tea capsule; by providing the illumination sensing mechanism, automatically sensing the illumination change, and driving the chamber door to close by illumination sensing, thereby solving the problem that the existing induction chamber door opening and closing device can only open the chamber door and cannot close it via induction, which easily causes the entrance of dust.

BRIEF DESCRIPTION OF DRAWINGS

In order to explain the technical solutions in the embodiments of the present disclosure more clearly, the following contents will briefly introduce the drawings which need to be used in the embodiments of the present disclosure. It would be obvious that the drawings in the following description are only embodiments of the present disclosure, and it is possible for a person skilled in the art to obtain other drawings according to these drawings provided without involving any inventive effort.

Figure 1:
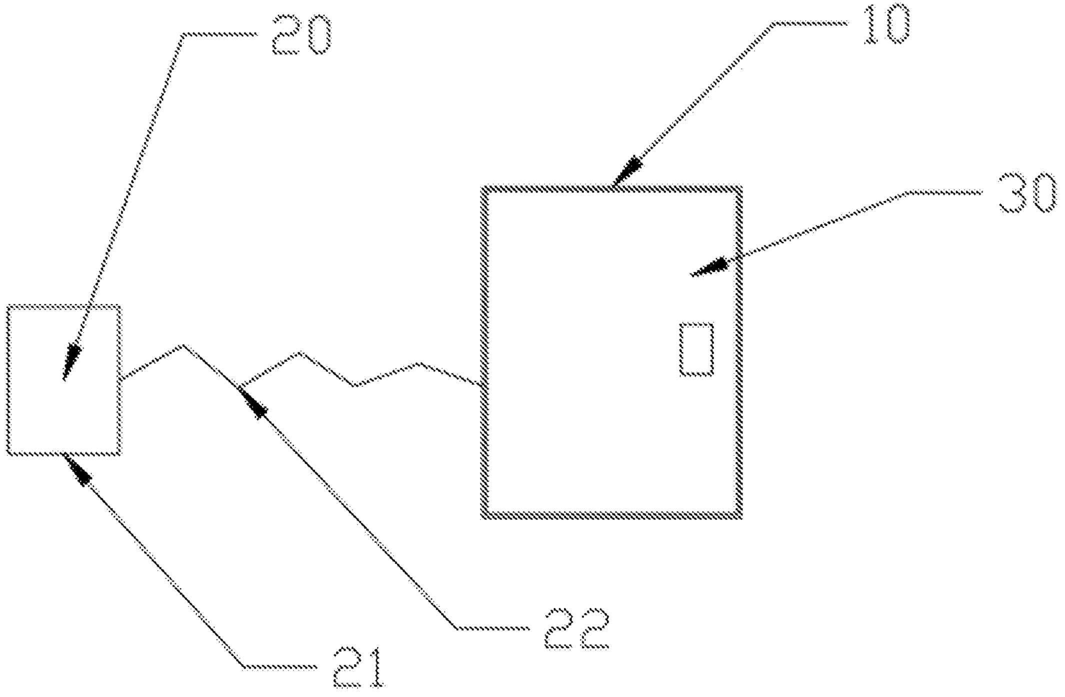
FIG. 1 is a schematic diagram showing a structure of an induction chamber door opening and closing device.

In the drawings, the components identified by the reference numerals are listed as follows:

10, chamber door; 11, sealing layer; 20, stretching mechanism; 21, cylinder; 22, spring; 30, recognition mechanism; 40, illumination sensing mechanism.

DETAILED DESCRIPTION OF THE EMBODIMENTS

In order that the objects, aspects and advantages of the embodiments of the present disclosure will become more apparent, a more complete description of the embodiments of the present disclosure will be rendered by reference to the appended drawings.

Figure 2:
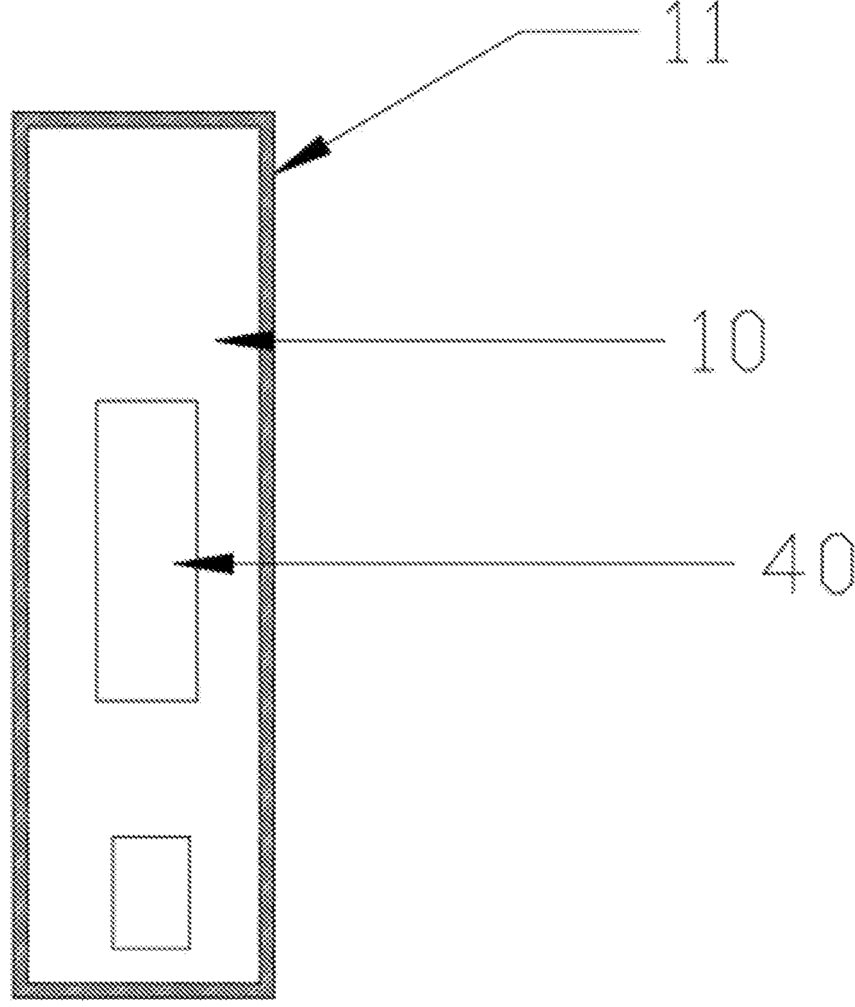
FIG. 2 is a schematic diagram showing a side structure of an induction chamber door opening and closing device.

As shown in FIGS. 1 and 2, the present disclosure provides a schematic diagram showing a structure of an induction chamber door opening and closing device including a chamber door 10, a recognition mechanism 30 and an illumination sensing mechanism 40, the chamber door 10 being provided at an outlet position of the induction chamber, the recognition mechanism 30 being provided on a surface of the chamber door 10 and configured for recognizing a tea capsule to drive the chamber door 10 to open, the illumination sensing mechanism 40 being provided on a side wall of the chamber door 10, not in contact with outside air, and configured for driving the chamber door 10 to be closed by illumination sensing, an interior of the chamber door 10 being further provided with a puncturing mechanism for puncturing the tea capsule.

During use, the tea capsule is placed on a top of the chamber door 10, and after detecting the weight of the heavy object via the recognition mechanism 30, the chamber door 10 is driven to open; after the chamber door 10 is opened, the tea capsule enters the sensing chamber, the illumination sensing mechanism 40 on a side of the chamber door 10 senses a change in illumination to drive the chamber door 10 to be closed, and after the chamber is closed, the puncturing mechanism moves, and the motor linearly drives the puncturing unit to puncture the capsule, thereby realizing a next tea brewing movement.

In the above-mentioned technical solution, the recognition mechanism 30 is a color-changing instrument, the color-changing instrument being provided at a top of the chamber door 10, the color-changing instrument being of the same size as the chamber door 10 for recognizing the tea capsules at various positions of the chamber door 10.

Furthermore, in the above-mentioned technical solution, the recognition mechanism 30 further includes a first switch electrically connected to the color-changing instrument for controlling switching of the color-changing instrument.

Furthermore, in the above-mentioned technical solution, the recognition mechanism 30 is a color-changing instrument, the color-changing instrument being provided at a top of the chamber door 10, the color-changing instrument being of the same size as the chamber door 10 for recognizing the tea capsules at various positions of the chamber door 10.

Further, in the above-mentioned technical solution, the illumination sensing mechanism 40 further includes a second switch, the second switch being electrically connected to the illumination sensor for controlling switching of the illumination sensor.

Furthermore, in the above-mentioned technical solution, the chamber door 10 has a rectangular shape, and further includes a stretching mechanism 20, the stretching mechanism 20 is provided between the chamber door 10 and the induction chamber mechanism for driving the chamber door 10 to open and close; the stretching mechanism 20 includes a cylinder 21 and a spring 22, the cylinder 21 is provided inside the induction chamber, one end of the spring 22 is fixedly connected to an output shaft of the cylinder 21, the other end of the spring 22 is fixedly connected to one end of the chamber door 10, and the spring 22 is configured for driving the chamber door 10 to open and close under pull by the cylinder 21.

Furthermore, in the above-mentioned technical solution, the cylinder 21, the spring 22 and the chamber door 10 are on a same horizontal plane for horizontally pulling the chamber door 10 to open and close, the spring 22 being a steel spring.

Further, in the above-mentioned technical solution, a sealing layer 11 is provided at a position where the chamber door 10 is in contact with the sensing mechanism, and the sealing layer 11 is configured to reduce vibration when the chamber door 10 is opened and closed, thereby sealing the sensor.

Embodiment 1

The induction chamber door opening and closing device includes a chamber door 10, a recognition mechanism 30 and an illumination sensing mechanism 40, the chamber door 10 being provided at an outlet position of the induction chamber, the recognition mechanism 30 being provided on a surface of the chamber door 10 and configured for recognizing a tea capsule to drive the chamber door 10 to open, the illumination sensing mechanism 40 being provided on a side wall of the chamber door 10, not in contact with outside air, and configured for driving the chamber door 10 to be closed by illumination sensing, an interior of the chamber door 10 being further provided with a puncturing mechanism for puncturing the tea capsule. The recognition mechanism 30 is a color-changing instrument, which is provided at the top of the chamber door 10, and the color-changing instrument is of a size same as the chamber door 10, and is configured for recognizing the tea capsule at various positions of the chamber door 10, Embodiment 2:

The induction chamber door opening and closing device includes a chamber door 10, a recognition mechanism 30 and an illumination sensing mechanism 40, the chamber door 10 being provided at an outlet position of the induction chamber, the recognition mechanism 30 being provided on a surface of the chamber door 10 and configured for recognizing a tea capsule to drive the chamber door 10 to open, the illumination sensing mechanism 40 being provided on a side wall of the chamber door 10, not in contact with outside air, and configured for driving the chamber door 10 to be closed by illumination sensing, an interior of the chamber door 10 being further provided with a puncturing mechanism for puncturing the tea capsule. The recognition mechanism 30 is a color-changing instrument, which is provided at the top of the chamber door 10, and the color-changing instrument is of a size same as the chamber door 10, and is configured for recognizing the tea capsule at various positions of the chamber door 10. The recognition mechanism 30 further includes a first switch electrically connected to the color-changing instrument for controlling the switch of the color-changing instrument.

Embodiment 3

The induction chamber door includes a chamber door 10, a recognition mechanism 30 and an illumination sensing mechanism 40, the chamber door 10 being provided at an outlet position of the induction chamber, the recognition mechanism 30 being provided on a surface of the chamber door 10 and configured for recognizing a tea capsule to drive the chamber door 10 to open, the illumination sensing mechanism 40 being provided on a side wall of the chamber door 10, not in contact with outside air, and configured for driving the chamber door 10 to be closed by illumination sensing, an interior of the chamber door 10 being further provided with a puncturing mechanism for puncturing the tea capsule. The recognition mechanism 30 is a color-changing instrument, which is provided at the top of the chamber door 10, and the color-changing instrument is of a size same as the chamber door 10, and is configured for recognizing the tea capsule at various positions of the chamber door 10. The recognition mechanism 30 further includes a first switch electrically connected to the color-changing instrument for controlling switching of the color-changing instrument. The illumination sensing mechanism 40 is an illumination sensor, and the illumination sensor is provided at one side of the chamber door 10 and is in contact with the outside air when the chamber door 10 is opened, for driving the chamber door 10 to be closed by sensing the change of illumination inside the chamber body. The illumination sensing mechanism 40 further includes a second switch, the second switch being electrically connected to the illumination sensor for controlling switching of the illumination sensor. The chamber door 10 has a rectangular shape, and further comprises a stretching mechanism 20, the stretching mechanism 20 is provided between the chamber door 10 and the induction chamber mechanism for driving the chamber door 10 to open and close; the stretching mechanism 20 comprises a cylinder 21 and a spring 22, the cylinder 21 is provided inside the induction chamber, one end of the spring 22 is fixedly connected to an output shaft of the cylinder 21, the other end of the spring 22 is fixedly connected to one end of the chamber door 10, and the spring 22 is configured for driving the chamber door 10 to open and close under pull by the cylinder 21. The cylinder 21, the spring 22 and the chamber door 10 are on a same horizontal plane for horizontally pulling the chamber door 10 to open and close, the spring 22 being a steel spring. A sealing layer 11 is provided at a position where the chamber door 10 is in contact with the sensing mechanism, and the sealing layer 11 is configured to reduce vibration when the chamber door 10 is opened and closed, thereby sealing the sensor.

Embodiment 4

Figure 3:
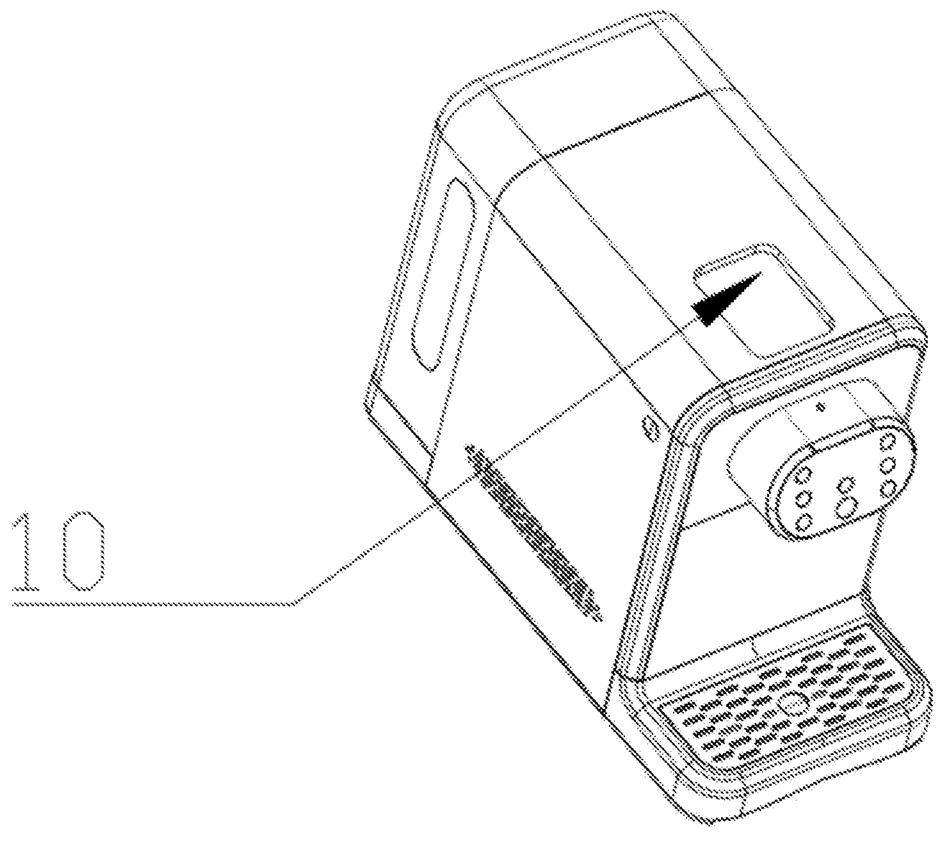
FIG. 3 is a schematic diagram showing a structure of a fourth embodiment of the induction chamber door opening and closing device.

FIG. 3 is a schematic diagram showing a structure of a fourth embodiment of the induction chamber door opening and closing device. The induction chamber door opening and closing device includes a chamber door 10, a recognition mechanism 30 and an illumination sensing mechanism 40, the chamber door 10 being provided at an outlet position of the induction chamber, the recognition mechanism 30 being provided on a surface of the chamber door 10 and configured for recognizing a tea capsule to drive the chamber door 10 to open, the illumination sensing mechanism 40 being provided on a side wall of the chamber door 10, not in contact with outside air, and configured for driving the chamber door 10 to be closed by illumination sensing, an interior of the chamber door 10 being further provided with a puncturing mechanism for puncturing the tea capsule. The recognition mechanism 30 is a color-changing instrument, which is provided at the top of the chamber door 10, and the color-changing instrument is of a size same as the chamber door 10, and is configured for recognizing the tea capsule at various positions of the chamber door 10. The recognition mechanism 30 further includes a first switch electrically connected to the color-changing instrument for controlling switching of the color-changing instrument. The illumination sensing mechanism 40 is an illumination sensor, and the illumination sensor is provided at one side of the chamber door 10 and is in contact with the outside air when the chamber door 10 is opened, for driving the chamber door 10 to be closed by sensing the change of illumination inside the chamber body. The illumination sensing mechanism 40 further includes a second switch, the second switch being electrically connected to the illumination sensor for controlling switching of the illumination sensor. The chamber door 10 has a rectangular shape, and further comprises a stretching mechanism 20, the stretching mechanism 20 is provided between the chamber door 10 and the induction chamber mechanism for driving the chamber door 10 to open and close; the stretching mechanism 20 comprises a cylinder 21 and a spring 22, the cylinder 21 is provided inside the induction chamber, one end of the spring 22 is fixedly connected to an output shaft of the cylinder 21, the other end of the spring 22 is fixedly connected to one end of the chamber door 10, and the spring 22 is configured for driving the chamber door 10 to open and close under pull by the cylinder 21. The cylinder 21, the spring 22 and the chamber door 10 are on a same horizontal plane for horizontally pulling the chamber door 10 to open and close, the spring 22 being a steel spring. A sealing layer 11 is provided at a position where the chamber door is in contact with the sensing mechanism, and the sealing layer 11 is configured to reduce vibration when the chamber door 10 is opened and closed, thereby sealing the sensor.

Specifically, the principles of the present disclosure are as follows: during use, the tea capsule is placed on a top of the chamber door 10, and after detecting the weight of the heavy object via the recognition mechanism 30, the chamber door 10 is driven to open; after the chamber door 10 is opened, the tea capsule enters the sensing chamber, the illumination sensing mechanism 40 on a side of the chamber door 10 senses a change in illumination to drive the chamber door 10 to be closed, and after the chamber is closed, the puncturing mechanism moves, and the motor linearly drives the puncturing unit to puncture the capsule, thereby realizing a next tea brewing movement.

What is claimed is:

1. An induction chamber door opening and closing device, comprising a chamber door (10), a recognition mechanism (30) and an illumination sensing mechanism (40), the chamber door (10) being provided at an outlet position of an induction chamber, the recognition mechanism (30) being provided on a surface of the chamber door (10) and configured for recognizing a tea capsule to drive the chamber door (10) to open, the illumination sensing mechanism (40) being provided on a side wall of the chamber door (10), not in contact with outside air, and configured for driving the chamber door (10) to be closed by illumination sensing, an interior of the chamber door (10) being further provided with a puncturing mechanism for puncturing the tea capsule;

wherein the recognition mechanism (30) is a color-changing instrument, the color-changing instrument being provided at a top of the chamber door (10), the color-changing instrument being of the same size as the chamber door (10) for recognizing the tea capsules at various positions of the chamber door (10);

wherein the recognition mechanism (30) further comprises a first switch electrically connected to the color-changing instrument for controlling switching of the color-changing instrument;

wherein the illumination sensing mechanism (40) is an illumination sensor, and the illumination sensor is provided at one side of the chamber door (10) and is in contact with the outside air when the chamber door (10) is opened, for driving the chamber door (10) to be closed by sensing change of illumination inside the chamber body;

wherein the illumination sensing mechanism (40) further comprises a second switch, the second switch being electrically connected to the illumination sensor for controlling switching of the illumination sensor.

2. The induction chamber door opening and closing device according to claim 1, wherein the chamber door (10) has a rectangular shape, and further comprises a stretching mechanism (20), the stretching mechanism (20) is provided between the chamber door (10) and the induction chamber mechanism for driving the chamber door (10) to open and close; the stretching mechanism (20) comprises a cylinder (21) and a spring (22), the cylinder (21) is provided inside the induction chamber, one end of the spring (22) is fixedly connected to an output shaft of the cylinder (21), the other end of the spring (22) is fixedly connected to one end of the chamber door (10), and the spring (22) is configured for driving the chamber door (10) to open and close under pull by the cylinder (21).

3. The induction chamber door opening and closing device according to claim 2, wherein the cylinder (21), the spring (22) and the chamber door (10) are on a same horizontal plane for horizontally pulling the chamber door (10) to open and close, the spring (22) being a steel spring.

4. The induction chamber door opening and closing device according to claim 3, wherein a sealing layer (11) is provided at a position where the chamber door (10) is in contact with the sensing mechanism, and the sealing layer (11) is configured to reduce vibration when the chamber door (10) is opened and closed, thereby sealing the sensor.

* * * * *